G. L. CHANIER.
FILM TESTING MACHINE.
APPLICATION FILED AUG. 5, 1921.

1,422,665.

Patented July 11, 1922.
5 SHEETS—SHEET 1.

Fig.1.

INVENTOR
G. L. Chanier
by Wilkinson & Giusta
ATTORNEYS

G. L. CHANIER.
FILM TESTING MACHINE.
APPLICATION FILED AUG. 5, 1921.

1,422,665.

Patented July 11, 1922.
5 SHEETS—SHEET 3.

G. L. CHANIER.
FILM TESTING MACHINE.
APPLICATION FILED AUG. 5, 1921.

1,422,665.

Patented July 11, 1922.
5 SHEETS—SHEET 4.

INVENTOR
G. L. Chanier
by Wilkinson & Giusta
ATTORNEYS

UNITED STATES PATENT OFFICE.

GASTON LOUIS CHANIER, OF JERSEY CITY, NEW JERSEY, ASSIGNOR TO PATHE EXCHANGE, INC., OF NEW YORK, N. Y., A CORPORATION OF NEW YORK.

FILM-TESTING MACHINE.

1,422,665.       Specification of Letters Patent.     Patented July 11, 1922.

Application filed August 5, 1921. Serial No. 490,054.

*To all whom it may concern:*

Be it known that I, GASTON LOUIS CHANIER, a citizen of the United States, residing at Jersey City, in the county of Hudson and State of New Jersey, have invented certain new and useful Improvements in Film-Testing Machines; and I do hereby declare the following to be a full, clear, and exact description of the invention, such as will enable others skilled in the art to which it appertains to make and use the same.

My present invention relates to a machine to test the proper light to be used when it is desired to make a positive print from a negative film; the object of the invention being to do away in a large measure with the expensive services of the skilled film tester now required for such work, to eliminate the guess work now incident to such testing, and to effect a material saving in time and expense in the testing operation.

To make positive prints from a motion picture negative, the unexposed positive film is brought in contact with the negative and run through a machine having a light, the rays of which act, through the negative, on the silver emulsion of the positive film. In order that a good print be obtained from the exposed positive film after treatment of same in the proper solutions, it is necessary to use a light of the correct strength.

The strength of the light can be changed by putting the light closer or farther from the film, by introducing a resistance in the circuit, or by reducing or enlarging the opening of the shutter of the printing machine or by other means. Printing machines have usually a scale of from 12 to 20 different strengths of light.

To select the proper light, it is the ordinary custom in motion picture laboratories to have a man, specially trained, estimate the density of the negative by transmitted light, and from that guess the correct amount of light needed for printing the positive. A short piece of film of about two feet is then printed with the selected light and treated, in order to ascertain that the light has been correctly selected. If the light is too weak or too strong, it is changed accordingly and another short piece printed, unless one is willing to take a chance on having guessed right. Of course this means waste of time and film.

The purpose of the film testing machine is to eliminate the guess work, the waste of film and of time, and make the selection of the proper light simple enough so that anybody, familiar with photography, can select the light.

The film testing machine has means for controlling the light so as to give the same scale of light as on the printing machine. The machine prints one picture with each of the various lights, so that, after the film sample is treated, there is one positive picture showing what result may be obtained with each of the different lights. It is consequently an easy matter to select with certainty the correct light necessary to make positive prints from this particular negative.

The machine is built, in fact, so as to print one picture on every alternate light. For example, if the scale of the printing machine has 16 different lights, the film testing machine will print one picture on every even light, or one on every odd light. This will then make 8 sample pictures, or one-half foot of film, for the whole scale of light, when the usual two foot length of film has only one light which has been guessed at. A sample on every alternate light is sufficient. It is evident that if one of two consecutive lights is a little too strong and the other a little too weak, the one between them will be right.

The film testing machine can also be used to make a negative sample print from a positive film, when one wants to print a duplicate negative from a positive print.

My invention will be more fully understood after reference to the accompanying drawings, in which like parts are indicated by similar reference symbols throughout the several views, and in which:—

Figure 4 shows a section along the line

4—4 of Figure 1, and looking in the direction of the arrows, the parts being shown on the same scale as in Fig. 1.

Figure 3:
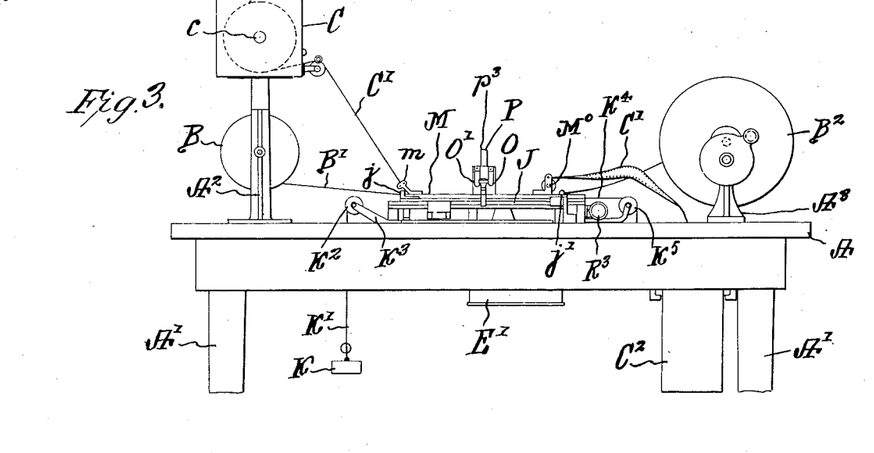
Figure 3 is a side elevation showing the apparatus on a much smaller scale, with the arrangements for holding and re-winding the positive and negative films mounted on the supporting table.
Figure 4:
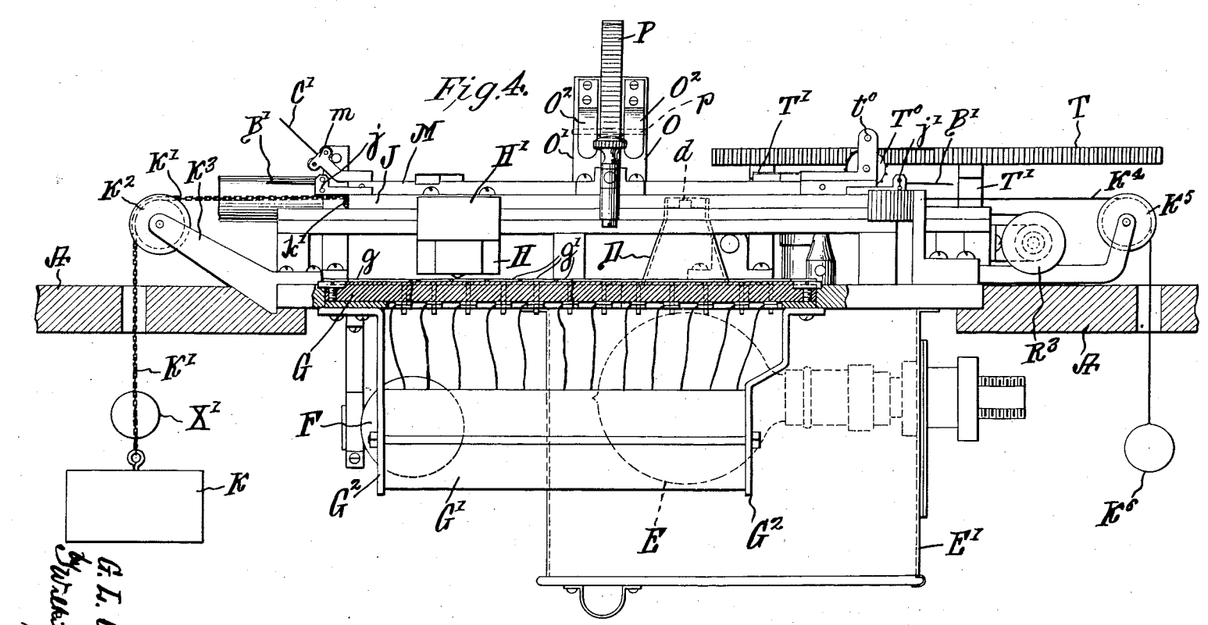

A represents the platform on which the various operating parts are supported. It may conveniently consist of a table top A supported on the legs A', as shown in Fig. 3, but any convenient support for the platform will suffice.

Mounted on the upper face of this platform are the brackets A² and A³. Journaled in the bracket A² is the roll B carrying the negative film B' which is conducted through the apparatus as will be hereinafter described, and is wound up on the re-winder B² which is journaled on the brackets A³.

Mounted on the bracket A² is the film box C, containing the positive film C', which is in the form of a roll C⁰ enclosed in said box, which roll is pivoted on a spindle c. This positive film C' passes through the apparatus as will be hereinafter described, and is conveyed to the box C² suspended from the platform A for treatment in the usual way.

Suitable guide rollers are provided for both the positive and negative films where desired.

D' represents an auxiliary frame mounted above the platform A on which the sliding carriage hereinafter described travels. D represents a casing provided with a light opening D⁰ above the white light E used in printing, and this opening D⁰ is provided with a slot d, see Figs. 2 and 6, through which the white light passes in the operation of printing. This white light E is mounted in the light-tight box E' in the usual way. The apparatus is also provided with red light F.

Mounted in the platform A is a block or slab G of insulating material, see Figs. 1, 4, 6 and 7. This block of insulating material carries a contact strip g connected to one of the terminals of electricity, as shown diagrammatically in Fig. 8, and the said block G is also provided with a series of contact pieces g' connected to various portions of the resistance coil G', as shown diagrammatically in Fig. 8, the end of which resistance coil is connected by the conductor e to the terminal e' of the white light E.

A traveling bridge H is caused to move over these contact pieces g' and contact strip g, and to automatically cut out or insert resistance in the circuit applied to the white light. The construction of this traveling bridge is shown in detail in Figs. 6 and 7, in which h and h' are two contact points pressed into engagement by the springs h², thus bridging the circuit from the nearest contact piece g' and the contact strip g.

Figure 8:
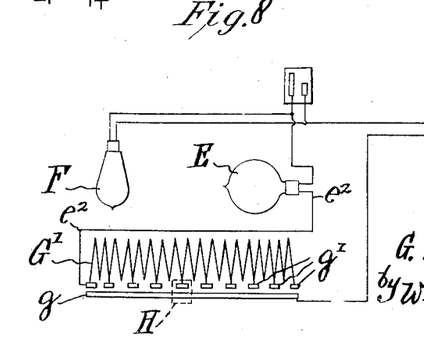
Figure 8 is a diagram showing the electric connections for the bridge and the red and white lights.

In Figure 8 I have shown ten such contact pieces g', with the bridge H indicated in dotted lines, making the circuit through the fifth contact piece from the left, closing the circuit. It will be seen that by moving this bridge from the left to the right, see Fig. 8, ten separate resistances may be inserted in the circuit of the light E, and thus ten different intensities of light used in printing may be secured.

The electric circuit through the lamp E and F is controlled by means of the switch arrangement shown in Figs. 1 and 9, and diagrammatically in Fig. 8, the operation of which will be hereinafter more fully described.

The traveling bridge H is carried by a bracket H', see Figs. 1, 4, 6, 7 and 10. This bracket is fast to the traveling carriage J, which reciprocates on top of the auxiliary frame D, said reciprocal movement being imparted in one direction by a rack and pinion driven by the power shaft, as will be hereinafter more fully described; the parts being restored to the initial position by the return weight K attached to chains XX fastened as at k' on each side of the traveling carriage J, and which run over pulleys K² carried by brackets K³, supported by platform A. (See Figure 4.) An apron K', the end of which k is attached to the carriage J, (see Fig. 2), passes also over pulley K² and is kept taut by a counterweight X'. The other end of said carriage has a similar apron K⁴, passing over the pulley K⁵, and having attached to the free end thereof, a counterweight K⁶. The purpose of these aprons kept taut by their counterweights is to prevent the negative film from getting scratched on the frame D when moving with the traveling carriage in its reciprocal movement.

Figure 1:
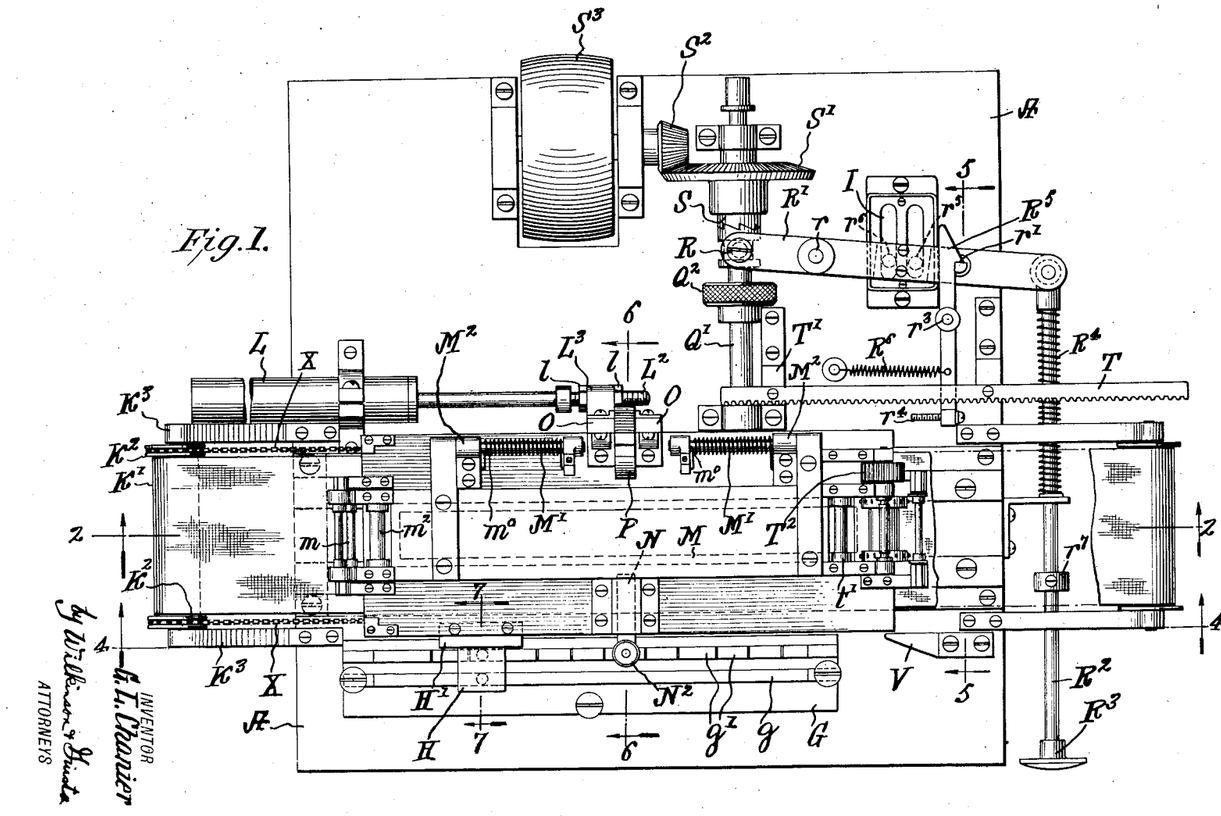
Figure 1 is a plan view of the complete apparatus, parts being broken away for the sake of clearness, and the door being shown in the closed position.
Figure 9:
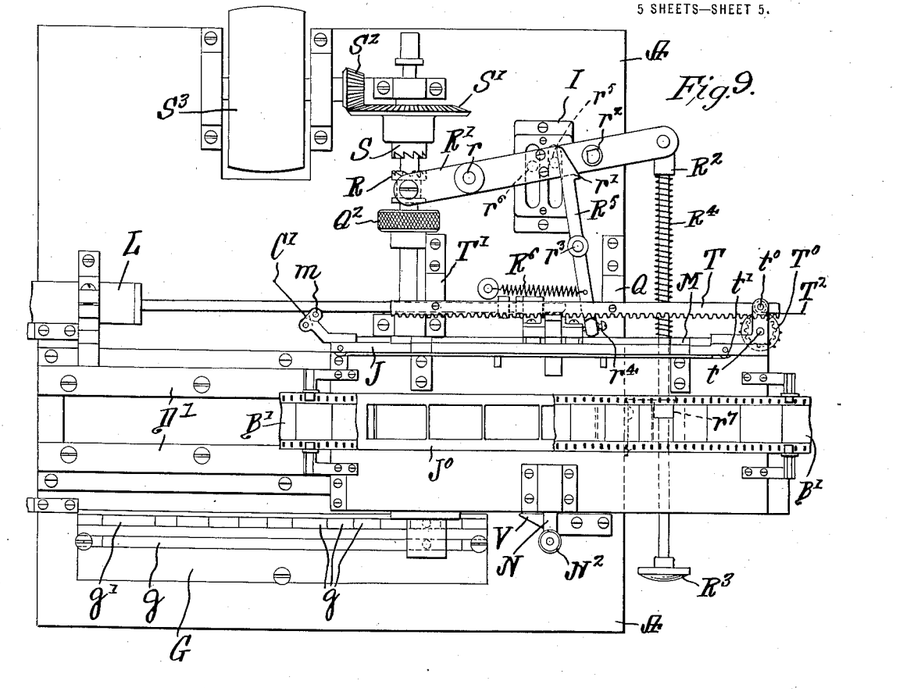
Figure 9 is a plan view of part of the apparatus shown in Figure 1, but with the door in the open position, and the carriage at the end of its travel.

A suitable shock absorber is provided to prevent unnecessary shock when the traveling carriage J returns to the initial position under the action of the weight K, such, for instance, as the pneumatic shock absorber L, shown in Figs. 1 and 9. The piston rod L² of said shock absorber is preferably screw-threaded near its end to engage the adjusting nuts $l$ on either side of the bracket L³ carried by the reciprocating carriage J. In this way the shock absorber may be very readily adjusted to suit required conditions.

Figure 2:
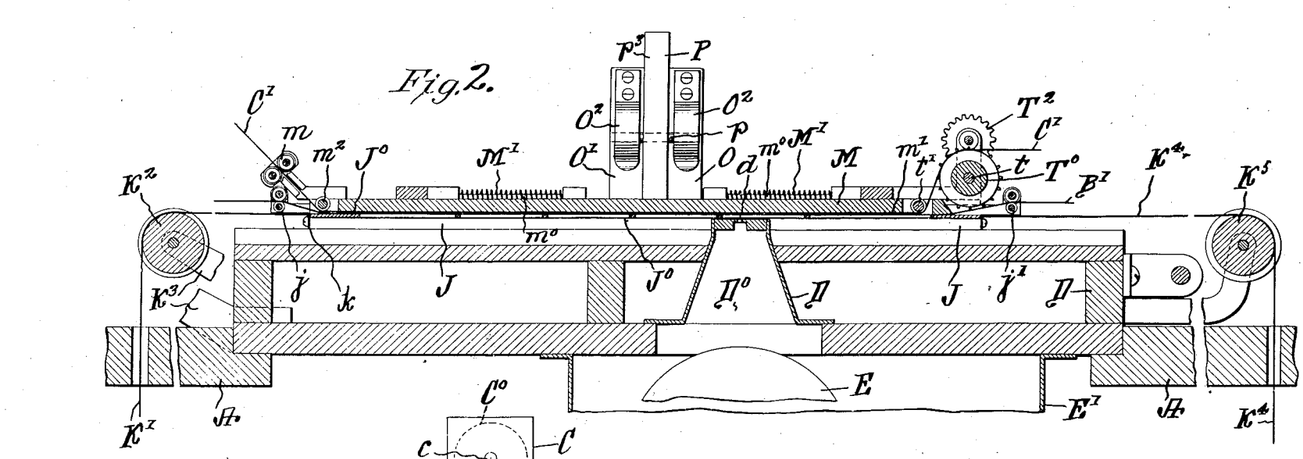
Figure 2 shows a section along the line 2—2 of Fig. 1, and looking in the direction of the arrows, the parts being shown on a somewhat larger scale than in Fig. 1.
Figure 10:
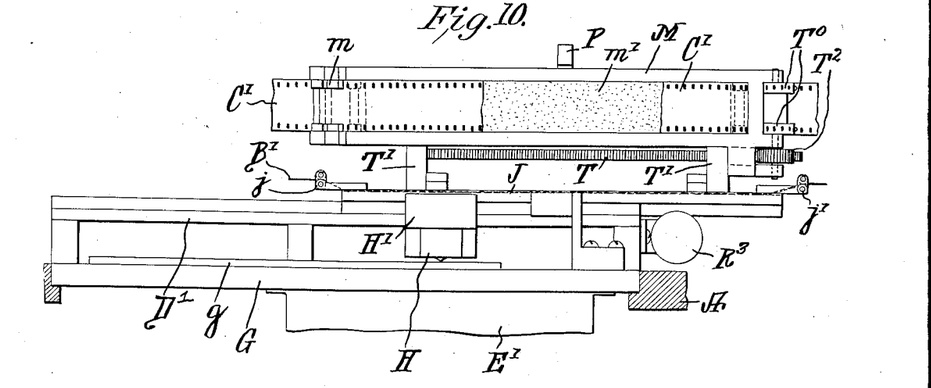
Figure 10 is a side elevation of the apparatus shown in Figure 9, parts being omitted for the sake of clearness in the drawings.

The negative film B' is rove between the guide rollers $j$ and $j'$ and their idlers at opposite ends of the carriage J (see Figs. 5 and 9) and this film is supported on the slotted plate J⁰, see Figs. 2 and 9. The end of the positive film is rove between the raised guide rollers $m$ and under the roller $m^2$ at one end of the hinged door M (see Figs. 1, 2, 3 and 10), and passes beneath the smooth plate $m'$ secured to the bottom of said door, and under the roll $t'$ and then under the guide roll $t^0$ and engages a toothed feeding roller T⁰ on the shaft $t$, journaled at the other end of said door, as shown in Figs. 2, 3 and 9. When the door M is in the closed position, shown in Figs. 1 to 6, the two films are held in superposed contact, and are drawn together across the light from the lamp E, as will be hereinafter described, but when the door M is open, as shown in Figs. 9 and 10, and in dotted lines in Fig. 6, the two films are separated.

Perfect contact of the two films, when the door is closed, is better obtained by replacing the smooth plate $m'$ by a pad of rubber or felt or other suitable material, or by any other means.

Figures 5, 6, 7:
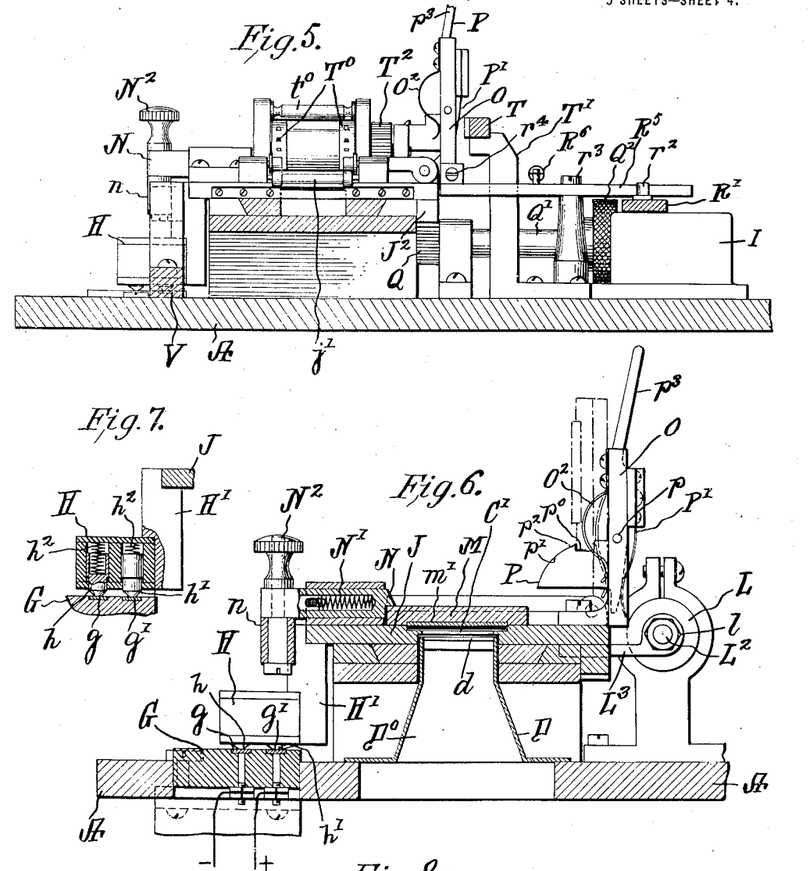
Figure 5 shows a section along the line 5—5 of Fig. 1, and looking in the direction of the arrows.
Figure 6 shows a section along the line 6—6 of Fig. 1, and looking in the direction of the arrows, parts being shown in elevation.
Figure 7 is a section along the line 7—7 of Fig. 1, parts being shown an a larger scale, and illustrates the construction of the traveling circuit closing bridge.

The door M is swung open by the coil springs M', surrounding the rods $m^0$, forming part of the hinges M², see Figs. 1 and 2, when the latch is automatically released, as will be hereinafter described; the latch may be released by hand by means of the knob N² (Fig. 6). The door is snapped down by hand to the closed position shown in Fig. 6, when the edge of the door will wedge back the face of the spring catch N, which catch is normally pressed into the locking position by means of the spring N', but may be withdrawn by means of the handle N².

When the latch is withdrawn, the door will be released and will spring from the closed position shown in full lines in Fig. 6 to the open position shown in dotted lines in said figure.

In order to lessen the shock of the automatic upward swinging movement of the door, I provide a buffer arrangement shown most clearly in Figs. 2, 5 and 6, in which O and O' represent two standards, each provided with a buffer spring O², which is shown in full lines in Fig. 6 when the door is closed, but which springs O² are compressed when the door is swung up to the open position as indicated in dotted lines in Fig. 6.

In order to lock the door in the open position I provide a suitable spring impressed catch, such as the bell crank lever P (see Figs. 1, 2, 4 and 6), pivoted as at $p$ between the standards O and O', and provided with a cam face $p'$ (see Fig. 6) and a claw $p^2$ with an operating arm $p^3$, the said claw $p^2$ being normally pressed towards the engaging position by the leaf spring P'. It will be seen that as the door is lifted it will wedge back the cam face $p'$ until the edge of the door passes the claw and the spring P' will then cause the notch $p^0$ to snap up and engage the contiguous edge of the door. To release the latch press the arm $p^3$ to the left (see Fig. 6) when the door may be swung down by hand.

The spring N' and the wedge face of the latch N will tend to ease the shock when the door is closed by hand.

As already described, the traveling carriage J, with the hinged door M mounted thereon, is restored to the initial position by the return weight K; but to feed the two forward together, with the two films held in contact, I provide a rack J², see Fig. 5, secured to the lower side of the carriage J, in which rack meshes the pinion Q, fast on the shaft Q', which may be turned manually by means of the knurled wheel Q² or this shaft Q' may be power driven as by the clutch connection R to the countershaft S having a bevel gear S', (see Fig. 1), meshing with the bevel pinion S² driven by the driving pulley S³. Obviously an electric motor or other driving means may be substituted for the pulley S³.

In order to conveniently control the power mechanism, and at the same time automatically control the electric light circuit, I provide a clutch lever R' pivoted as at $r$ and connected at one end to the clutch member R, and at the other end to the connecting rod R² controlled by the handle R³. This clutch lever R' is normally thrown to the disengaged position by the coil spring R⁴, and is held in the locked position by the spring impression latch R⁵ which is provided with a catch $r'$ engaging the lug $r^2$ on the lever R'. This latch is shown in the engaged position in Fig. 1, and in the disengaged position in Fig. 9. This latch R⁵ is pivoted as at $r^3$ and is acted upon by the spring R⁶. The latch is also provided with an adjustable screw stop $r^4$ so that it may be properly adjusted. It will be seen that when the clutch mechanism is in engagement, the latch R⁵ will hold the lever R' in the position shown in Fig. 1, in which case the power mechanism is free to act.

When the parts are in the position shown in Fig. 9, the counterweight K pulls the carriage J back in its starting position, relieving the pressure on screw $r'$. Spring $R^6$ will then bring latch $R^5$ in such a position that by pulling on the handle $R^3$ against the action of the spring $R^4$, the lock $r^2$ will wedge back the catch $r'$, and the spring $R^6$ will snap the said catch in engagement above said lug in the position shown in Fig. 1, at which time the clutch arrangement will be held in the operative position.

In order to release by hand the clutch mechanism, push away the catch $r'$ by hand and the spring $R^4$ will restore the parts to the position shown in Fig. 9. The stop collar $r^7$ limits the travel of the rod $R^2$.

The lever $R'$ carries two contact points $r^5$ and $r^6$ which coact with the switch arrangement I and complete the circuit through the white light when the clutch is in the position shown in Fig. 1, and through the red light when the clutch is in the position shown in Fig. 9.

Referring to Figure 8, when the lever $R'$ is in the position shown in Fig. 1, the red light is short-circuited by the lever and the white light only is lighted. The current coming through the wire marked + runs through the wire going to the small contact piece (see Fig. 8), then through the switch, then down to the bulb E, then through the wire $e^2$ then through the coil $G'$, then through one of the small contact pieces $g'$, then through the traveling bridge and the contact piece $g$.

When the lever is in the position shown in Figure 9, the current entering through the wire marked + goes to the red light F, then through the upper wire to the white light E, then through the wire $e^2$, through the first contact piece $g'$ on the left, and through the traveling bridge to contact piece $g$. The red bulb being of small amperage compared to the white bulb, in this case the red bulb only is lighted.

The wiring could be done, of course, in a different way, so as to have the current go through either the red light or the white light, but it was found in practice that there was quite some sparking when the contact was changed from one light to the other, and it was found that by letting the current go through the white light all the time, this sparking was avoided.

Any suitable arrangement of switch mechanism and electric connections may be used for this purpose, and I do not claim any special arrangement, as such are well known in the art; my invention being limited to other details which will be hereinafter pointed out in the claims.

In order to provide for the repeated feeding of the positive film while the negative film is at rest, so as to secure the series of test prints referred to, I provide a special arrangement to accomplish this purpose which is operable only when the door is open.

This arrangement comprises the rack T mounted on brackets T', which rack is raised above the top of the traveling carriage J, and the said rack registers with the pinion $T^2$, mounted on the shaft of the sprocket $T^0$ journaled on the top of the door as shown in Figs. 1, 5, 9 and 10. This actuates the feed wheel $T^0$ by means of which the positive film is fed to the machine. It will be seen that when the door is lifted, any further movement of the carriage J, carrying the door with it, will cause the fixed rack T to rotate the pinion $T^2$ and will operate the positive film feed, drawing a short fresh length of said film over the negative film which latter in the meantime is not moved at all.

Thus, for each operation of the machine a fresh strip of positive film may be drawn over the negative film and subjected to the action of the light, as will be hereinafter more fully described.

The door may be opened at any time by simply releasing the latch N, as before described, but in order to provide for the automatic opening of the door when the carriage J reaches a predetermined limit of its travel, I provide a cam V, see Figs. 1, 5 and 9, which is secured to the platform A and engages the roller $n$ on the stem of the latch N, as shown most clearly in Figs. 5, 6 and 9.

When the carriage J, with the door M mounted thereon, moves far enough for this roller $n$ to engage the cam V, said roller will ride up on said cam, drawing the latch N back against the action of the spring N' and allowing the door to swing up into the open position where it will be held securely by the latch P, as already explained with reference to Figs. 5 and 6.

Thus it will be seen that during the operation of printing the test strip, the door is held down and locked in the closed position, and as soon as the printing has been completed the door is automatically released and springs up to the raised position, permitting a fresh strip or segment of a strip of the positive film to be automatically fed to the door, so that when the door is returned to the closed position again a fresh surface of sensitive positive film may be exposed to the action of the light.

The opening of the door will automatically break the electric circuit through the white light, but the closing of the door will automatically complete the circuit. This may be accomplished in any convenient or well known way, and the electric connections for accomplishing this purpose not being a part of my present invention will not be further described herein.

By providing a suitable switch arrangement the white light may be turned on and the print made on the positive film when the carriage travels over any one of the segments $g'$, and thus a series of test prints may be made with the light under varying conditions, and by selecting that segment which produces the light giving the best results, a substantially accurate guide may be secured for printing from the entire negative film.

The operation of the device is as follows:

We will consider the machine as having the carriage to the left, the door opened, the clutch R in the disengaged position; the switch is turned on, lighting the red light.

The roll of film carrying the scenes (negative) to be tested is put in the bracket $A^2$. The film is threaded between the roller $j$ and its idlers, placed over the slotted plates $J^0$ so that the thin bars of the plate correspond to spaces between pictures on the film, and threaded through the roller $j'$ and its idlers. (Figure 9).

The roll of positive raw film is put in film box C. The film is then threaded through the rollers $m$, under roller $m^2$, run along the pad $m'$, then under roller $t'$, and is threaded between the sprocket $T^0$ and the roller $t^0$, the teeth on the sprocket $T^0$ engaging the perforations on each side of the film.

The door is then closed bringing the two films in contact. The handle $R^3$ is pulled engaging the clutch with the countershaft S. The contact points $r^5$ and $r^6$ being now in the position shown in Fig. 1, the white light is on and the red light is off.

The traveling carriage and the door then move forward carrying the two films over the slot $d$, the white light then printing the image of the negative on the positive film. As the carriage progresses the contact point $h'$ of the traveling bridge H passes successively on every contact piece $g'$, thereby varying the strength of the light. The length of the contact pieces $g'$ is the same as the length of a picture, so that the strength of the light is changed at each picture but does not vary as this picture passes over the slot $d$.

When the carriage arrives at the end of its travel, the cam V opens the latch N. The coil springs M' open the door locking it on catch P, and engaging pinion $T^2$ with rack T. (See Fig. 9.)

As the counterweight K pulls the carriage back in its open position, the pinion $T^2$ travelling on rack T, turns the sprocket $T^0$, which feeds the exposed section of film off the machine into box $C^2$, pulling an unexposed section in its place.

The negative is then wound up by hand on the re-winder $A^3$, until another portion to be tested is reached, when the whole process is repeated. When all the various scenes on the roll of negative have been tested, the exposed film is cut off by hand and then treated in the usual manner.

After the film has been treated, the correct light is chosen from the tests, for each of the scenes of the negative to be printed.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. Apparatus of the character described, comprising a platform with a light aperture therein, and an electric light mounted below said aperture; an electric circuit connected to said light, and including a series of resistance coils; a traveling carriage, with means for holding the negative and positive films in superposed position thereon, means for moving said carriage longitudinally, and means controlled by said carriage for closing the electric circuit seriatim through the several resistance coils, thereby increasing of decreasing the intensity of the electric light.

2. Apparatus of the character described, comprising a platform with a light aperture therein, and an electric light mounted below said aperture; an electric circuit connected to said light, and including a series of resistance coils, a reciprocating traveling carriage, with means for holding the negative and positive films in superposed position thereon, means for moving said carriage longitudinally in reverse directions, and means controlled by said carriage for closing the electric circuit seriatim through the several resistance coils, thereby increasing or decreasing the intensity of the electric light.

3. Apparatus of the character described, comprising a platform with a light aperture, therein, and an electric light mounted below said aperture; an electric circuit connected to said light, and including a series of resistance coils, a reciprocating traveling carriage, means for holding the negative and positive films in superposed position thereon, when moving in one direction, means for separating the two films when said carriage moves in the opposite direction, means for moving said carriage longitudinally in reverse directions, and means controlled by said carriage for closing the electric circuit seriatim through the several resistance coils thereby increasing or decreasing the intensity of the electric light.

4. Apparatus of the character described, comprising a platform with a light aperture therein, and an electric light mounted below said aperture; an electric circuit connected to said light, and including a series of resistance coils, a reciprocating traveling carriage, means for holding the negative and positive films in superposed position thereon when moving in one direction, means for separating the two films and for simultaneously feeding the positive film when said carriage moves in the opposite direction, means for moving said carriage longitudinally in reverse directions, and means controlled by said carriage for closing the electric circuit seriatim through the several resistance coils, thereby increasing or decreasing the intensity of the electric light.

5. Apparatus of the character described, comprising a platform with a light aperture therein, and an electric light mounted below said aperture; an electric circuit connected to said light, and including a series of resistance coils; a traveling carriage, with means for holding the negative and positive films in superposed position thereon, means for moving said carriage longitudinally, and a bridge carried by said carriage and adapted to close the electric circuit seriatim through the several resistance coils, thereby increasing or decreasing the intensity of the electric light thrown on the passing films.

6. Apparatus of the character described, comprising a platform with a light aperture therein, and an electric light mounted below said aperture; an electric circuit connected to said light, and including a series of resistance coils, a reciprocating traveling carriage, with means for holding the negative and positive films in superposed position thereon, and for releasing same when desired, means for moving said carriage longitudinally in reverse directions, and a bridge carried by said carriage and adapted to close the electric circuit seriatim through the several resistance coils, thereby increasing or decreasing the intensity of the electric light thrown on the passing films.

7. Apparatus of the character described, comprising a platform with a light aperture therein, and an electric light mounted below said aperture; an electric circuit connected to said light, and including a series of resistance coils with corresponding contacts; a traveling carriage, with means for holding the negative and postive films in superposed position thereon, means for moving said carriage longitudinally, and a bridge carried by said carriage and provided with contacts adapted to close the electric circuit seriatim through the several resistance coils, thereby increasing or decreasing the intensity of the electric light thrown on the passing films.

8. Apparatus of the character described, comprising a platform with a light aperture therein, and an electric light mounted below said aperture; an electric circuit connected to said light, and including a series of resistance coils with corresponding contacts, a reciprocating traveling carriage, with means for holding the negative and positive films in superposed position thereon, and for releasing same when desired, means for moving said carriage longitudinally in reverse diections, and a bridge carried by said carriage and provided with contacts adapted to close the electric circuit seriatim through the several resistance coils, thereby increasing or decreasing the intensity of the electric light thrown on the passing films.

9. Apparatus of the character described, comprising a platform with a light aperture therein, and an electric light mounted below said aperture; an electric circuit connected to said light, and including a series of resistance coils, a reciprocating traveling carriage, with means for holding the negative and positive films in superposed position thereon, and for releasing same when desired, means controlled by said carriage for closing the electric circuit seriatim though the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

10. Apparatus of the character described, comprising a platform with a light aperture therein, and an electric light mounted below said aperture; an electric circuit connected to said light, and including a series of resistance coils, a reciprocating traveling carriage, means for holding the negative and positive films in superposed position thereon when moving in one direction, means for separating the two films when said carriage moves in the opposite direction, means controlled by said carriage for closing the electric circuit seriatim through the several resistance coils thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

11. Apparatus of the character described, comprising a platform with a light aperture therein, and an electric light mounted below said aperture; an electric circuit connected to said light, and including a series of resistance coils, a reciprocating traveling carriage, means for holding the negative and positive films in superposed position thereon when moving in one direction, means for separating the two films and for simultaneously feeding the positive film when said carriage moves in the opposite direction, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

12. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for feeding the positive film while the door is in the open position, means for moving said carriage longitudinally in reverse directions, and means controlled by said carriage for closing the electric circuit seriatim through the several resistance coils, thereby increasing or decreasing the intensity of the electric light.

13. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage and for threading the positive film through said door, means for holding said door in the closed position on said carriage, with the films superposed, means for releasing said door and allowing it to fly open thereby separating said films, means for feeding the positive film while the door is in the open position, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

14. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions, comprising power mechanism and gearing operated thereby for moving said carriage during the printing operation, means for automatically releasing said driving gearing, and means for restoring said carriage to the initial position.

15. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

16. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means for moving said carriage longitudinally in reverse directions, and means controlled by said carriage for closing the electric circuit seriatim through the several resistance coils, thereby increasing or decreasing the intensity of the electric light.

17. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage and for threading the positive film through said door, means for holding said door in the closed position on said carriage, with the films superposed, automatic means for releasing said door and allowing it to fly open thereby separating said films, automatic means for feeding the positive film while the door is in the open position, and means controlled by said carriage for closing the electric circuit seriatim through the several resistance coils, thereby increasing or decreasing the intensity of the electric light, and means for moving said carriage longitudinally in reverse directions.

18. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage and for threading the positive film through said door, means for holding said door in the closed position on said carriage, with the films superposed, automatic means for releasing said door and allowing it to fly open thereby separating said films, automatic means for feeding the positive film while the door is in the open position, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

19. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions.

20. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions, comprising power mechanism and gearing operated thereby for moving said carriage during the printing operation, means for automatically releasing said driving gearing, and means for restoring said carriage to the initial position.

21. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the electric light, and means for moving said carriage longitudinally in reverse directions.

22. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position.

23. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means for moving said carriage longitudinally in reverse directions, and means controlled by said carriage for closing the electric circuit seriatim through the several resistance coils, thereby increasing or decreasing the intensity of the electric light.

24. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage and for threading the positive film through said door, means for holding said door in the closed position on said carriage, with the films superposed, automatic means for releasing said door and allowing it to fly open thereby separating said films, means for automatically locking said door in the open position, automatic means for feeding the positive film while the door is in the open position, and means controlled by said carriage for closing the electric circuit seriatim through the several resistance coils, thereby increasing or decreasing the intensity of the electric light, and means for moving said carriage longitudinally in reverse directions.

25. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for locking said door in the open position, means for threading the negative film through said carriage and for threading the positive film through said door, means for holding said door in the closed position on said carriage, with the films superposed, automatic means for releasing said door and allowing it to fly open thereby separating said films, automatic means for feeding the positive film while the door is in the open position, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position, with a shock absorber interposed between the carriage and the platform and actuated as said carriage returns to the intial position.

26. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions.

27. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions, comprising power mechanism and gearing operated thereby for moving said carriage during the printing operation, means for automatically releasing said driving gearing, and means for restoring said carriage to the initial position, with a shock absorber interposed between the carriage and the platform and actuated as said carriage returns to the initial position.

28. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby separating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the electric light, and means for moving said carriage longitudinally in reverse directions.

29. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, a spring catch for holding said door in the closed position on said carriage, with the films superposed, a cam for automatically releasing said spring catch and allowing said door to fly open thereby saparating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the light, and means for moving said carriage longitudinally in reverse directions, comprising power mechanism and gearing operated thereby, means for automatically releasing said driving gearing, and a return weight with parts operated thereby for restoring said carriage to the initial position, with a shock absorber interposed between the carriage and the platform and actuated as said carriage returns to the initial position.

30. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils thereby increasing or decreasing the intensity of the electric light, and means for moving said carriage longitudinally in reverse directions, comprising power mechanism and gearing operated thereby for moving said carriage during the printing operation, means for automatically releasing said driving gearing, and means for restoring said carriage to the initial position, with a shock absorber interposed between the carriage and the platform and actuated as said carriage returns to the initial position.

31. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding said door in the closed position on said carriage, with the films superposed, means for releasing said door and allowing it to fly open thereby separating said films, means for automatically locking said door in the open position, means for feeding the positive film while the door is in the open position, comprising a pinion carried by the door, film feed mechanism driven by said pinion, and a rack secured to said platform and engaging said pinion as the carriage returns to the initial position, means controlled by said carriage for closing the electric circuit seriatim through the several resistance coils, thereby increasing or decreasing the intensity of the electric light, and means for moving said carriage longitudinally in reverse directions, comprising power mechanism and gearing operated thereby for moving said carriage during the printing operation, means for automatically releasing said driving gearing, and a return weight with parts operated thereby for restoring said carriage to the initial position, with a shock absorber interposed between the carriage and the platform and actuated as said carriage returns to the initial position.

32. Apparatus of the character described, comprising a platform with a light aperture therein, and an electric light mounted below said aperture; an electric circuit connected to said light, and including a series of resistance coils, a reciprocating traveling carriage, a spring controlled door hinged to said carriage, means for threading the negative film through said carriage, and for threading the positive film through said door, means for holding the door in the closed position on said carriage, with the films superposed, means for releasing said door and allowing it to fly open thereby separating said films, means for automatically locking said door in the open position, means for feeding the positive film while the door is in the open position, means for moving said carriage longitudinally in reverse directions, and means controlled by said carriage for closing the electric circuit seriatim through the several resistance coils, thereby increasing or decreasing the intensity of the electric light.

33. Apparatus of the character described, comprising an electric light, and an electric circuit therefor, a partition with a light aperture therein, means for passing the negative film and the positive film to be printed in superposed relation past said aperture, and means controlled by said last mentioned means for varying the intensity of the light passing through said aperture, comprising a series of resistance coils included in the electric circuit, and a bridge moving with said films and closing the electric circuit successively through said resistance coils.

34. Apparatus of the character described, comprising an electric light, and an electric circuit therefor, a partition with a light aperture therein, means for passing the negative film and the positive film to be printed in superposed relation past said aperture, and means controlled by said last mentioned means for varying the intensity of the light passing through said aperture according to a predetermined scale, comprising a series of resistance coils included in the electric circuit, and a bridge moving with said films and closing the electric circuit successively through said resistance coils.

GASTON LOUIS CHANIER.